United States Patent
Gardner

(10) Patent No.: US 9,063,764 B2
(45) Date of Patent: Jun. 23, 2015

(54) AUTOMATED SOFTWARE SCRIPT CREATOR AND EDITOR

(75) Inventor: Jason Gardner, Henderson, NV (US)

(73) Assignee: KASEYA LIMITED (IE)

( * ) Notice: Subject to any disclaimer, the term of this patent is extended or adjusted under 35 U.S.C. 154(b) by 0 days.

(21) Appl. No.: 13/479,862

(22) Filed: May 24, 2012

(65) Prior Publication Data
US 2013/0318495 A1 Nov. 28, 2013

(51) Int. Cl.
*G06F 9/44* (2006.01)
*G06F 9/455* (2006.01)

(52) U.S. Cl.
CPC .............. *G06F 9/45508* (2013.01); *G06F 8/71* (2013.01); *G06F 9/45512* (2013.01); *G06F 8/33* (2013.01); *G06F 8/36* (2013.01); *G06F 8/30* (2013.01)

(58) Field of Classification Search
CPC .............. G06F 8/30; G06F 8/33; G06F 8/36; G06F 8/38; G06F 8/71; G06F 9/45508; G06F 9/45512
See application file for complete search history.

(56) References Cited

U.S. PATENT DOCUMENTS

| | | | | |
|---|---|---|---|---|
| 6,658,645 B1 * | 12/2003 | Akuta et al. | ................... | 717/110 |
| 7,032,211 B1 * | 4/2006 | Janzig et al. | ................... | 717/115 |
| 7,065,768 B1 * | 6/2006 | Janzig et al. | ................... | 717/115 |
| 7,237,243 B2 * | 6/2007 | Sutton et al. | ................... | 719/310 |
| 7,673,292 B2 * | 3/2010 | Vikram | ................... | 717/115 |
| 7,856,617 B2 * | 12/2010 | Szlam | ................... | 717/110 |
| 8,239,826 B2 * | 8/2012 | Elenburg et al. | ................... | 717/110 |
| 8,954,926 B2 * | 2/2015 | Braun et al. | ................... | 717/115 |
| 2005/0257190 A1 * | 11/2005 | Shaburov et al. | ................... | 717/106 |
| 2006/0020915 A1 * | 1/2006 | Lloyd et al. | ................... | 717/111 |
| 2007/0005342 A1 * | 1/2007 | Ortscheid | ................... | 704/9 |
| 2008/0109788 A1 * | 5/2008 | Prieto | ................... | 717/115 |
| 2008/0127128 A1 * | 5/2008 | Mateescu et al. | ................... | 717/115 |
| 2010/0083225 A1 * | 4/2010 | Giat | ................... | 717/111 |
| 2010/0205529 A1 * | 8/2010 | Butin et al. | ................... | 715/704 |
| 2010/0205530 A1 * | 8/2010 | Butin et al. | ................... | 715/715 |
| 2011/0083119 A1 * | 4/2011 | Emmelmann | ................... | 717/111 |
| 2011/0271258 A1 * | 11/2011 | Park et al. | ................... | 717/127 |
| 2012/0005520 A1 * | 1/2012 | Ashraff et al. | ................... | 717/176 |
| 2012/0047488 A1 * | 2/2012 | Ambichl et al. | ................... | 717/124 |
| 2012/0047489 A1 * | 2/2012 | Varadharajan | ................... | 717/124 |
| 2013/0159974 A1 * | 6/2013 | Norton et al. | ................... | 717/124 |
| 2013/0226984 A1 * | 8/2013 | Sunderrajan | ................... | 709/202 |

OTHER PUBLICATIONS

Kaseya, Virtual System Administrator User Guide Version 6.0, Aug. 4, 2010, Kaseya International Limited, pp. 1-551; <http://help.kaseya.com/WebHelp/EN/VSA/6000000/link.asp?vsa-guide>.*

(Continued)

*Primary Examiner* — Thuy Dao
*Assistant Examiner* — Ben C Wang

(57) ABSTRACT

A method and apparatus of creating a script are enclosed. One example method of operation may provide receiving a request to load a procedure in a procedure editor application and generating a list of predetermined statements based on the loaded procedure. The example method may include receiving at least one statement selection from the list of predetermined statements and at least one specified location in the procedure and inserting the at least one selected statement into the loaded procedure at the at least one specified location.

15 Claims, 9 Drawing Sheets

(56) References Cited

OTHER PUBLICATIONS

Gligoric et al., "Automated Migration of Build Scripts using Dynamic Analysis and Search-Based Refactoring", 2014 ACM, OOPSLA'14, Oct. 2014, Portland, OR, pp. 599-616; <http://dl.acm.org/results.cfm?h=1&source_query=&&cfid=477181031&cftoken=37040274>.*

Leita et al., "ScriptGen: an automated script generation tool for honeyd ", 2006 IEEE, ACSAC 2005, Dec. 2005, pp. 1-12; <http://ieeexplore.ieee.org/stamp/stamp.jsp?tp=&arnumber=1565248>.*

Geometric, "Scriptless Test Automation", Feb. 2011, Geometric Limited, pp. 1-11; <http://geometricglobal.com/wp-content/uploads/2013/03/Geometric_Whitepaper_scriptless_test_automation.pdf>.*

* cited by examiner

FIG. 4

AVAILABLE STATEMENTS
110

MISC
  COMMENT()
CONDITIONS
  CHECKVAR()
  ELSE
  EVAL()
  GET64BITREGISTRYVALUE()
  GETOS()
  GETRAM()
  GETREGISTRYVALUE()
  HAS64BITREGISTRYKEY()
  HASREGISTRYKEY()
  ISAPPRUNNING()
  ISSERVICERUNNING()
  ISUSERACTIVE()
  ISUSERLOGGEDIN()
  ISYESFROMUSER()
  TESTFILE()
  TESTFILEINDIRECTORYPATH()
  TRUE
STEPS
  FILE
    COPYFILE()      COPYFILEUSERCREDENTIALS()      CREATEWINDOWSFILESHARE()

⊗ NEW   📁 OPEN   💾 SAVE   💾 SAVE AS

DISK PROCEDURE
120

IF HAS64BITREGISTRYKEY("MYREGKEY")
  IF ISAPPRUNNING("MYAPP")
    CREATEWINDOWFILESHARE()

FILE...      140

COPYFILE
COPYFILEUSERCREDENTIALS
CREATEWINDOWSFILESHARE
DELETEFILE
DELETEFILEINDIRECTORYPATH
EXECUTEFILE

FIG. 6

AUTOMATED SOFTWARE SCRIPT CREATOR AND EDITOR

TECHNICAL FIELD OF THE INVENTION

The present invention is generally related to a software script editor configured to create procedures and perform optimized systems management related operations.

BACKGROUND OF THE INVENTION

Conventionally, a software procedure is a set of automated tasks that are setup to be executed at particular times. A server may include a management application that a user may access to establish particular applications, operations, and execution times for end user machines that require management.

The procedures may be setup by a systems administrator and stored on the server. As operation times mature, the tasks or procedures may be transmitted to the client machines that are scheduled to receive management operations. The scripts used to define a set of tasks or procedures may be complicated and cumbersome for a systems administrator to write by hand, especially for a novice administrator with limited software language experience.

SUMMARY OF THE INVENTION

One example embodiment of the present invention includes a method of creating a script. The method may include receiving a request to load a procedure in a procedure editor application, generating a list of predetermined statements based on the loaded procedure, receiving at least one statement selection from the list of predetermined statements and at least one specified location in the procedure and inserting the at least one selected statement into the loaded procedure at the at least one specified location.

Another example embodiment of the present invention may include an apparatus configured to create a script. The apparatus may include a receiver configured to receive a request to load a procedure in a procedure editor application. The apparatus may also include a processor configured to generate a list of predetermined statements based on the loaded procedure, receive at least one statement selection from the list of predetermined statements and at least one specified location in the procedure, and insert the at least one selected statement into the loaded procedure at the at least one specified location.

BRIEF DESCRIPTION OF THE DRAWINGS

FIG. 4 illustrates an example graphical user interface (GUI) of a procedure editor performing another statement insertion procedure according to example embodiments.

FIG. 6 illustrates an example graphical user interface (GUI) of a procedure editor performing a script creation procedure according to example embodiments.

DETAILED DESCRIPTION

Example embodiments provide a software code procedure editor configured to replace an existing agent and/or service desk script creation procedure or operation. The present information technology (IT) systems management application may allow the creation of scripts in a simple and efficient manner.

For example purposes, a procedure may include a set of automated tasks to be scheduled and executed on a managed device (client) or on a management server, as part of a service desk effort (i.e., ticket workflows). The "scripts" used to define the sets of tasks, are created/edited within a virtual system administrator (VSA) application and stored on a server. The tasks may be transmitted to the managed device for execution, or scheduled for server execution within a service desk application.

Procedures that are executed within the IT systems management application according to example embodiments, are typically performed with extensible markup language (XML) or via LUA scripts and processed by a procedure execution engine. It is possible to write the scripts by hand, however, such an effort requires experience and time for the typical user who is responsible for such tasks.

According to example embodiments, the application used to create and execute management scripts may be a cross-platform, browser-based web application that utilizes computer-based tools, such as Adobe Flash/Apache Flex platforms. The management application may be hosted within a VSA web page(s), or spawned into a new tab/window to communicate with the server using web-based services in order to load and save procedure data.

Figure 1:
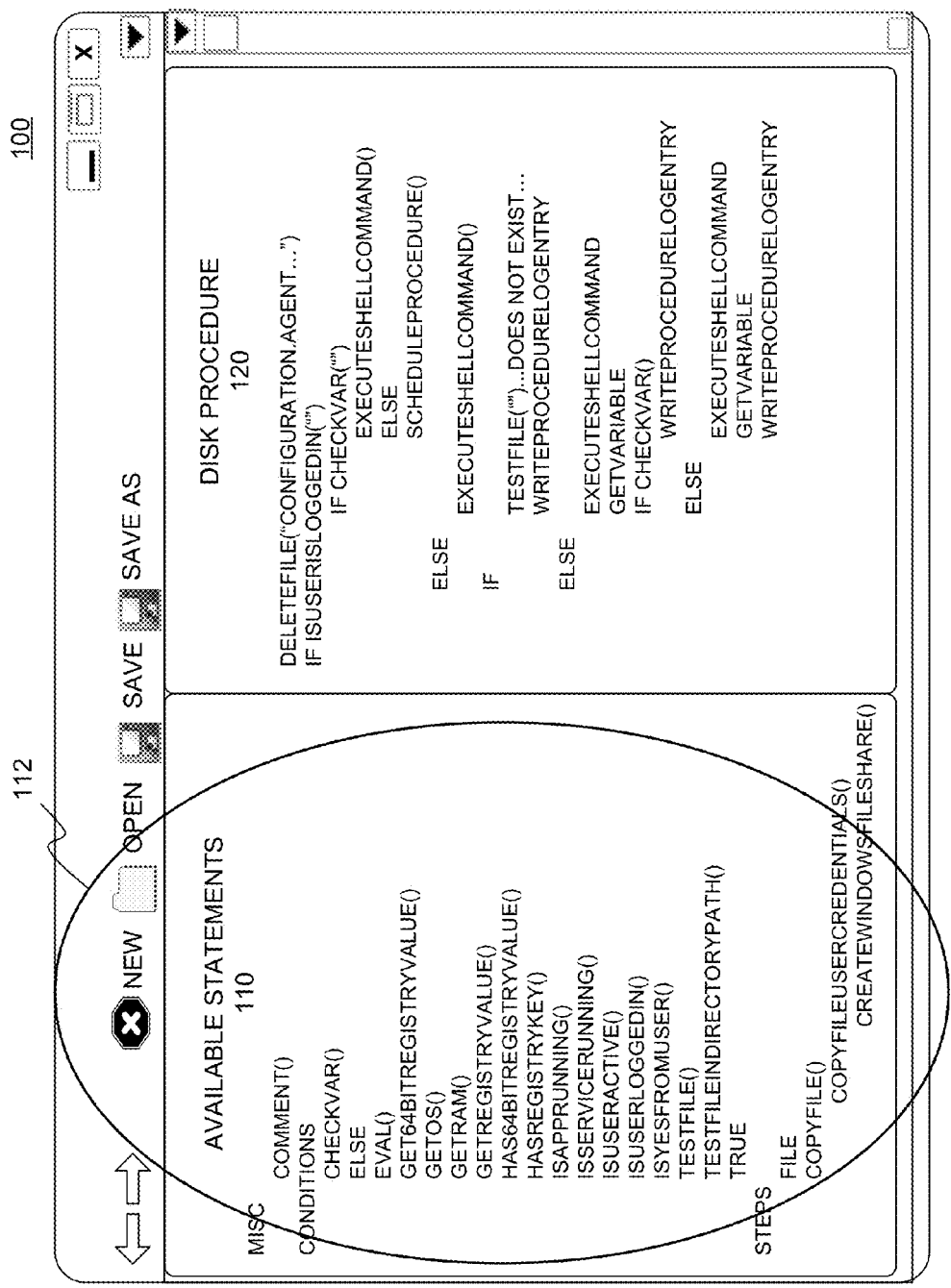
FIG. 1 illustrates an example graphical user interface (GUI) of a procedure editor according to example embodiments.

FIG. 1 illustrates an example GUI of an agent procedure editor 100 according to example embodiments. Referring to FIG. 1, a statements panel of available statements 110 is illustrated as a default set of statements that may be selected and incorporated into the active working area of the scripts 120. For example purposes, a disk procedure 120 is used to perform maintenance on the client machines. However, any script or operation may be setup to be edited, modified, scheduled, etc., by a systems administrator to perform maintenance on client workstation machines from an administrative server. The GUI 100 may be operating on a server machine operated by a systems administrator.

The available statements 112 may be the most frequently used statements which automatically cycle in and out of the user display depending on their relative use and popularity. For example, a memory storage may have all of the possible statements stored for retrieval upon request. In one example, a particular procedure and/or application (i.e., disk procedure 120) may invoke a predetermined list of available statements 110 that are made available based on their likely incorporation with a particular procedure. The disk procedure 120 being loaded may invoke a predetermined list of available statements 110 that is paired with the statements in the disk procedure (i.e., variables, functions, etc.).

The list of statements, such as individual task steps and/or conditional statements may be made available to the user based on the context (i.e., type of procedure currently being created/edited). The statements are categorized and sorted with a filter control to further assist in locating a desired statement. In operation, a user may hover the mouse pointer or other input device peripheral over any statement in the list to invoke a popup tool-tip having more detail about a given statement. Also, as a result of a selection or pre-selection operation (i.e., hovering operation), a list of statements may automatically populate once a particular procedure is targeted or selected.

Figure 2:
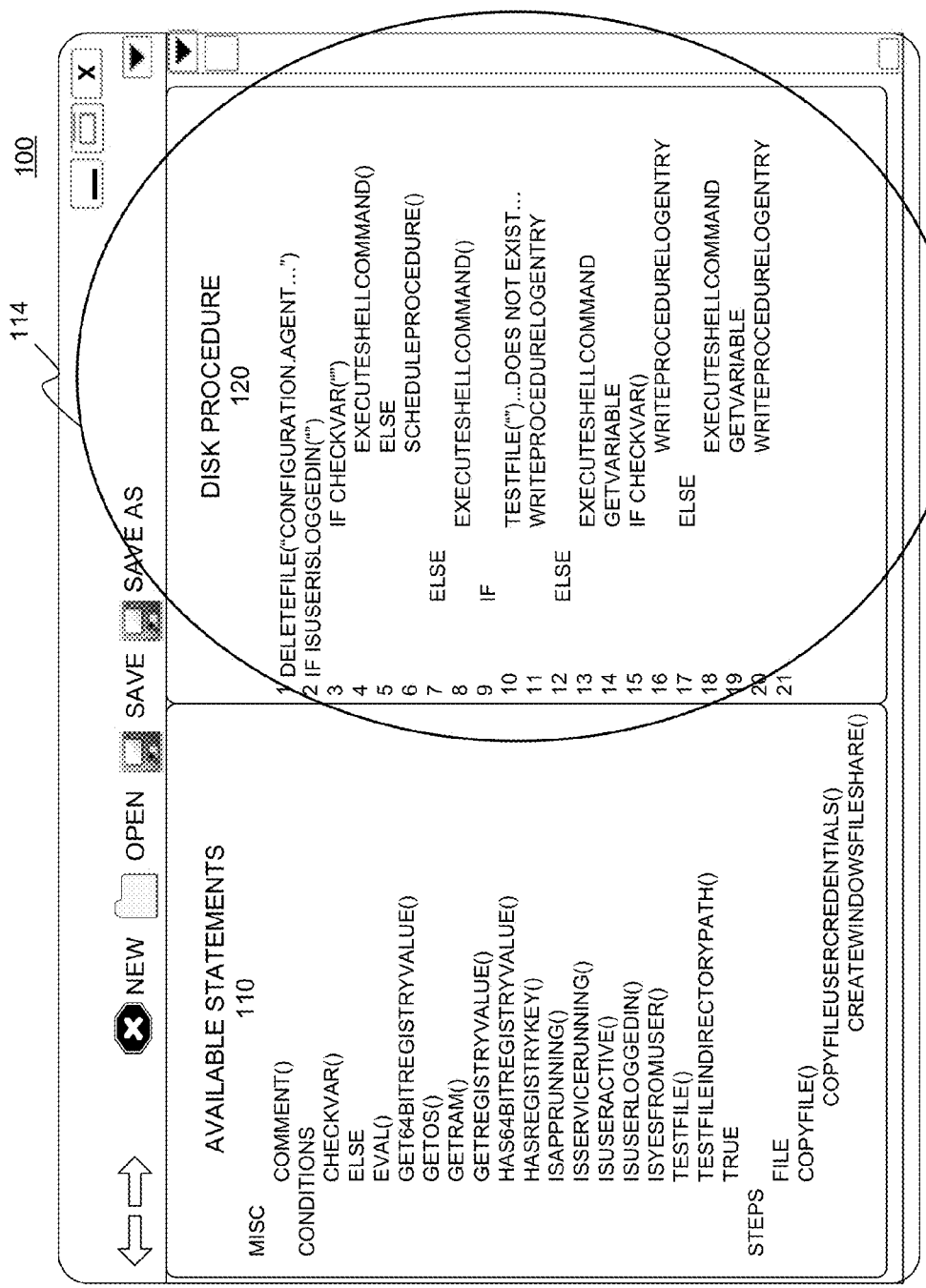
FIG. 2 illustrates an example graphical user interface (GUI) of a procedure editor performing a disk procedure according to example embodiments.

FIG. 2 illustrates an example GUI including a procedure canvas with a line editing interface according to example embodiments. The procedure canvas includes a procedure editor area 114 of the application which displays the details of the current procedure. Each line of the procedure is displayed in a "program code" like format, which assists the users in a gradual shift to a full lightweight programming language (i.e., LUA). The editor application may support a multi-document, tabbed interface, for manipulation of several procedures at once.

The procedure editor 114 currently interacts with the server with certain commands, such as "GetInitializationData", "GetProcedure", "GetProcedureList", "GetVariablesList", "GetFileList", and "SaveProcedure." When the procedure editor is launched, it is provided with a few elements of data as startup arguments, including the URL of the server's web service, authentication tokens, user's preferred language, color theme preference, etc. The editor will use the server URL and authorization tokens to call the "GetInitializationData" procedure on the server, which returns the data necessary for the editor to be functional, including the list of available statements and translated text for the GUI, based on the user's language settings. This data provides enough information to render the GUI and allow the user to begin editing a new procedure.

In another example, "GetProcedure" is a procedure which allows a procedure definition to be retrieved from the server to be viewed/edited by the user within the editor. If a user has selected a particular procedure for 'Edit' on the server, the procedure editor 114 will receive that procedure's identifier (ID) in its startup arguments and will request the procedure definition automatically upon performing a load operation. If the user has selected to open the editor to create a 'New' procedure, an empty procedure is initialized on the load operation. Within the editor, the user also has the ability to click an 'Open' button to select an existing procedure to open or a 'New' button to start a new empty procedure in a new tab of the editor's canvas. When the procedure (or procedure modifications) needs to be persisted on the server, the "SaveProcedure" method is invoked, and the procedure definition is sent from the editor to the server.

As statements are added to the procedure canvas, the statement definition is parsed and each element of the statement (e.g., "Function", "Parameters", "Operator", "Comparison Value") is evaluated and the appropriate type of user control is created on the canvas's present line of interest (note lines 1-21 of FIG. 2). Each control has a 'readonly' mode, that is shown normally, and an 'edit' mode, when the control is clicked or tabbed for editing purposes. This 'readonly' mode may be initiated in order for the procedure to look more like a 'Program Code' when viewed, but still gives the ability to edit each value by toggling it to edit mode. When the user selects an existing line on the editor canvas, an optional "Property Panel" can be used to edit the values in a more traditional, form-like manner. This was performed to help existing users transition to the new design concepts.

In general, a procedure definition contains a collection of line objects, each storing the ID of the statement it was created from and the values that were inputted by the user for its parameters. When a procedure is loaded from the server, each line is added to the canvas by cross-referencing the ID with the statement definition that exists in the available statements collection, recreating the line/property panel controls based on the statement definition, and then defaulting the controls' values to what is stored in the procedure line definition.

"GetProcedureList", "GetVariablesList", and "GetFileList" are additional procedures that retrieve list data used for particular parameter editing controls. For example, if a statement has a parameter which is to indicate a reference to another procedure (such as the 'executeProcedure' statement's first function parameter), the list of available procedures (returned from the 'GetProcedureList' method) can be loaded into a selection control for the user to choose from. The same may occur for the controls that require a server file path (GetFileList) or text parameters that can contain server defined variables (GetVariablesList).

The list of statements may not change once it has been loaded. When the editor initially loads and invokes "GetInitializationData", it provides the server with information about what type of editor has been launched (i.e., Agent Procedure, Service Desk Procedure, etc.), based on startup arguments from the server. The editor may not edit multiple types of procedures at the same time, and therefore, the statement list does not need to change as the user opens additional procedures or navigates between tabs. The list of statements can be filtered by the user using the provided controls, in order to quickly locate the desired statement, but this is just a visual filtering. The statement list is static, and reverts to the entire list when the filter is cleared by the user. In other embodiments, the editor allows a user to open different types of procedures within one GUI session, and when new procedures are created, the user is able to specify what type they are creating (for example, by creating a "New" menu option). The editor still only receives one set of statements via the "GetInitializationData" message on initial startup, but the list in the tree control is additionally filtered depending on which type of procedure is actively being edited, and changes as the user navigates between tabs or opens other procedures.

The application may utilize caching of statements for performance reasons, as the statements rarely change. When the statement list is retrieved from the server, it is cached on the user's computer using standard browser caching mechanisms, along with an ID returned from the server. On subsequent launches of the editor, it will relay these cached IDs to the server so that the server can determine if the cached data is usable. If so, the server will indicate to the editor that it may use its cached data. If not, a new statement list is returned by the server and the cache is replaced.

Figure 3:
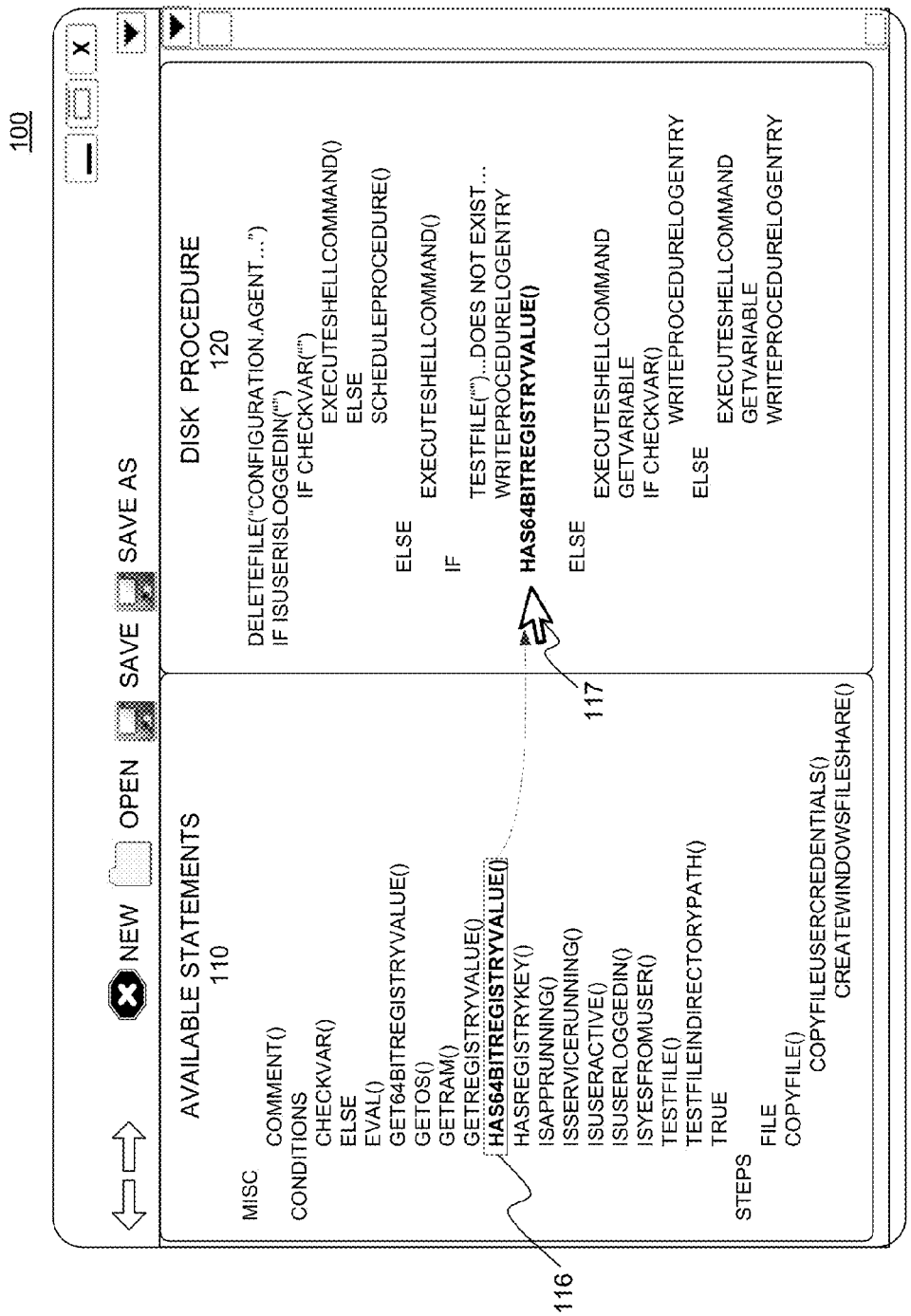
FIG. 3 illustrates an example graphical user interface (GUI) of a procedure editor performing a statement insertion procedure according to example embodiments.

FIG. 3 illustrates an example drag-and-drop operation used to add an operation/function from the statement list 110 to the active procedure 120. In order to add an individual line to a procedure, the user may identify a statement of interest (i.e., "HAS64BITREGISTRYVALUE 116) and drag that statement from the statement panel 110 with their mouse pointer and drop it onto the canvas of the present procedure 120. The line can be dropped in an empty area below the current procedure lines, to add the line to bottom of the procedure, or the line can be dropped between existing lines at the desired depth. A guide arrow 117 may appear to indicate where the line will be dropped. Alternatively, a statement can be double-clicked, which will automatically add the statement to the bottom of the current procedure. Statements may be added automatically to the canvas set of operations depending on the administrative actions sought by the user or based on a predetermined schedule.

Figure 4:
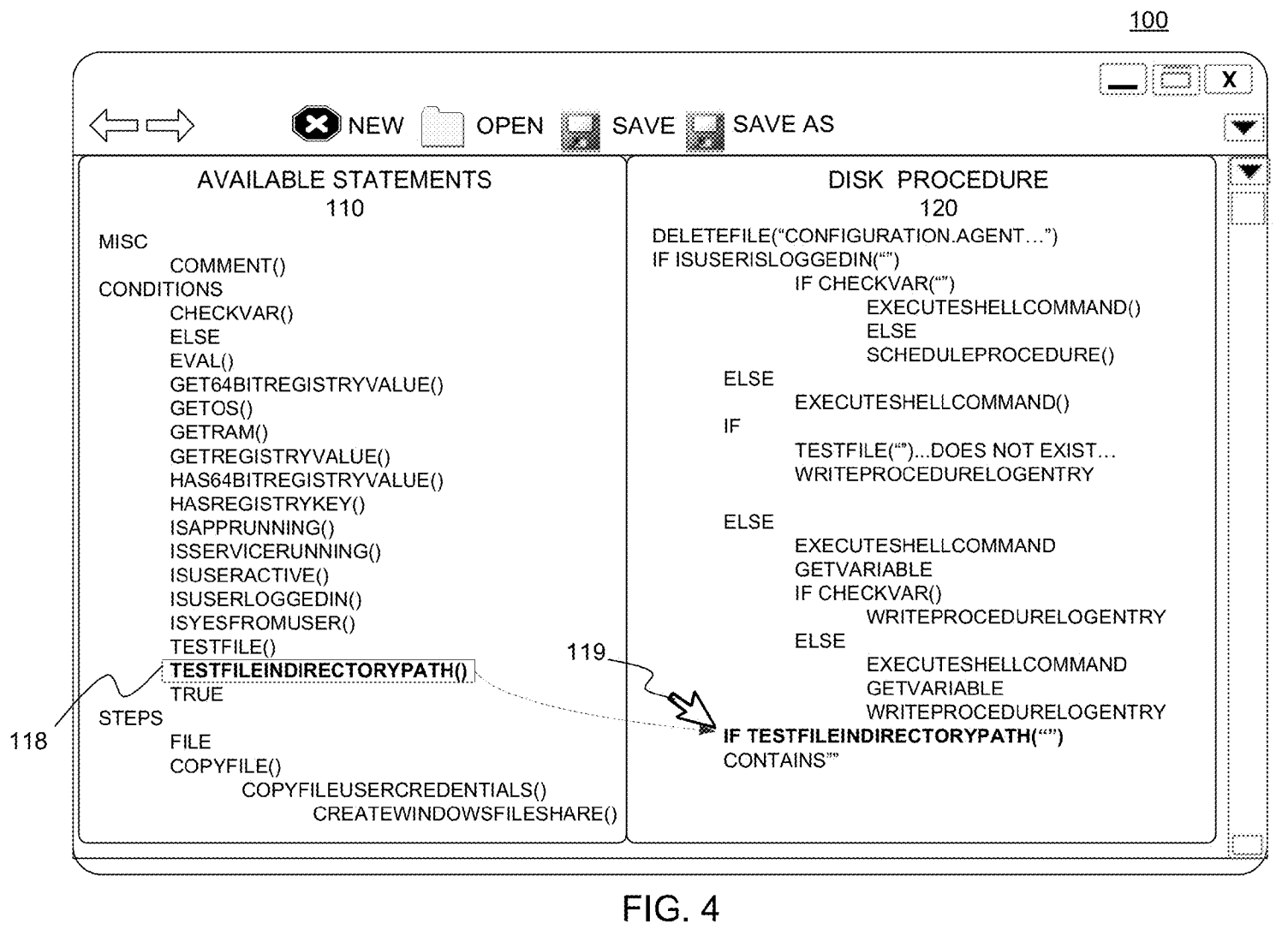

FIG. 4 illustrates another example drag-and-drop operation used to add an operation/function from the statement list 110 to the active procedure 120. In this example, conditional statements may be added as part of the added statement. Lines within the canvas beginning with an "If" statement may have children, which are illustrated in the procedure using indentation. If a procedure line is a child, it executes only if its parent conditional evaluates to "true." Changing the indentation will in turn change which procedure line is the parent, and ultimately, the logic of the procedure. The conditional statement is created for a particular statement (i.e., 'TESTFILEINDIRECTORYPATH' 118) which is inserted into the canvas code. Indentation can be set when dragging the line onto the procedure (the arrow 119 provides the indentation with an indication), by producing the line edit controls, which appear when a line is hovered over and/or selected and clicking the appropriate green arrow, or by pressing the [Tab] key when the line is selected. A change in indentation may only occur if the change is logical, based on validation of the procedure by the editor.

The line controls may also display a red dash "-" next to the arrow 117/119 (not shown), which allows the user to remove the line from the procedure without performing a manual deletion procedure. Alternatively, the line can be removed by pressing the [Delete] key when the line is selected. Procedure lines that already exist in the procedure can be moved to a new location via a drag and drop operation. The line being moved may be selected and dragged between the lines where it may be moved. The arrow indicator 117/119 will display to assist the user in placing the line at the correct index and indentation depth. Also, procedure lines can be copy/pasted using keyboard shortcuts or right-click context menus. Moving, indenting, removing, and copy/pasting lines can also be done to multiple lines at one time, when the multiple line selection feature is used. Multiple lines may be selected using a [Shift]-click or holding [Shift] during an up/down arrow navigation operation. Again, the procedure is validated for logical errors on any of these actions and changes can be reverted if necessary.

Figure 5:
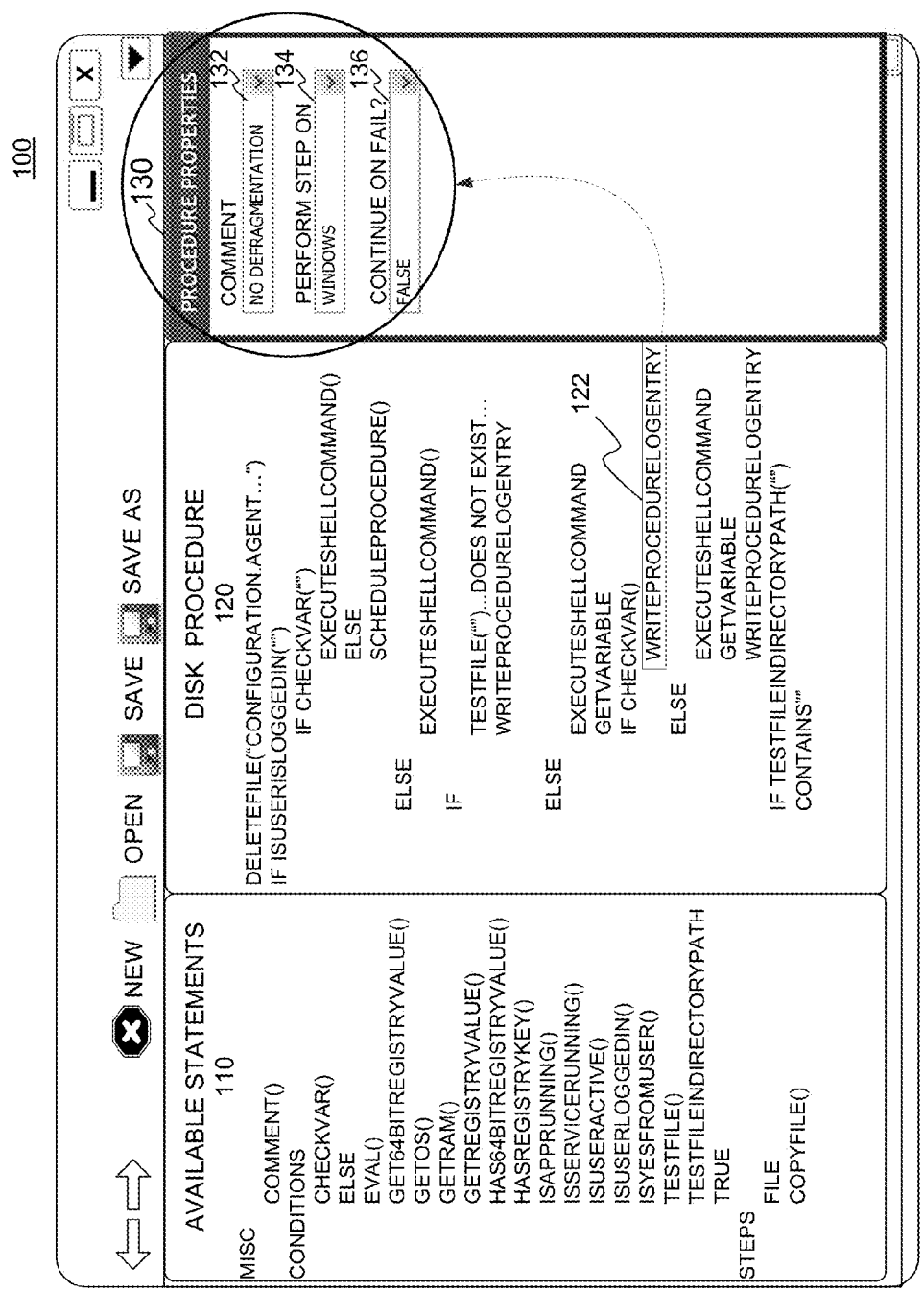
FIG. 5 illustrates an example graphical user interface (GUI) of a procedure editor performing a procedure properties procedure according to example embodiments.

FIG. 5 illustrates another example GUI with a procedure properties menu option according to example embodiments. Referring to FIG. 5, the procedure canvas parameter editor may provide two methods for editing line parameters. The first method may include the use of the "Procedure Properties" 130 panel. Upon selecting a line within the procedure, the properties panel 130 may be populated with the current line parameter values, allowing the user to make modifications to those values. As values are modified, the line within the procedure canvas is immediately updated. This approach provides novice users with easy modification options to the procedure code/script.

Referring to FIG. 5, a statement was added (i.e., "WRITEPROCEDURELOGENTRY") to invoke the writing of an entry into the procedure log, which invokes the menu for the procedure properties 130. Menu option 132 provides an option for adding a particular comment at the time of modifying or creating the statement portion of the current procedure (i.e., "the disk does not need to be defragmented"). Menu option 134 provides an option of where to perform the operation (i.e., "Windows"), and menu option 136 provides an option to determine whether to continue the operation in the event of a failed operation.

Statements added to a procedure correspond to either conditions or steps, which are ultimately executed sequentially on the target computer by a script execution engine. A condition is a statement that is evaluated for a true/false result, in order to determine whether or not child statements should be executed. A step is a single script execution unit. Each statement is composed of a function, which has a variable number of function parameters, and in the case of condition statements, an operator and comparison value. The statements and their parameters are unique and specified by the server when the procedure editor is initialized. As statements are added to the procedure editor canvas, the line controls and property panel controls are created dynamically, based on the received statement definition.

The function describes which type of task will be executed on the target computer, with the function parameters serving as the criteria when invoking the task. The example shown in FIG. 5 illustrates an example of a 'step' statement. In this case, the target computer (while executing this line of the procedure) will be writing a line of text (option 132) to a log file of a predetermined location. Option 134 indicates which operating system the target computer must have in order to execute this line, and option 136 determines whether or not the script will cease execution, should this line cause an error when performed.

For condition statements, an operator is specified, to indicate how to compare the function's result value to the comparison value, e.g., If
   testFileInDirectoryPath("C:\myfile.txt") contains "StringOfTextToFind."

This example of a condition describes how, on the target computer during execution, the "testFileInDirectoryPath" function is invoked, and passed in a reference to a file path as criteria. The file is evaluated to see if it "Contains" (Operator) the character sequence "StringOfTextToFind" (Comparison Value). If this evaluates to be true, then the procedure lines that are children of this statement will be executed.

The procedure editor is disconnected from the actual execution engine, and is responsible for allowing the creation of known procedures and having them stored on the server for later invocation. The actual implementation of the execution engine can change over time, assuming it can still interpret the procedure script format.

A more advanced method of parameter editing is available as "in-line" menu options. For example, a drop-down menu may be embedded in the actual procedure canvas 120 to include options similar to those provided in the procedure properties menu 130. This provides the user to take advantage of the screen real estate, and directly edit the values on the procedure canvas. Each value on a procedure line can be clicked to cause the value to enter an "edit mode", for direct parameter editing. In addition, each value may produce a tooltip describing the parameter in detail.

As the user makes changes to the parameters using the [Enter] or [Tab] keys, the next value on the procedure line will become editable. Such functionality, along with the up/down keyboard navigation and indent/remove keyboard shortcuts, allows the user to move from value to value, line by line, and edit the entire procedure using only the keyboard, which greatly increases productivity.

FIG. 6 illustrates another GUI feature allowing for quick keyboard based editing of a procedure according to example embodiments. Referring to FIG. 6, a text cursor and list of known statements are generated based on the user inputted text. In this example, the user may enter a word, such as "file" and a list of known statements 140 may be automatically generated once the user text is inputted into the procedure canvas 120. The list may be presented to the user in the GUI at the bottom of the procedure line last edited by the user. The user may select the option via a mouse selection or by pressing [Tab]/[Enter] on the last editable value of the last procedure line. When this text cursor is present the user can enter all/part of a statement name, and a list of possible matches is made available to the user, allowing the user to bypass the drag and drop operations and add a procedure line directly via keyboard input.

Such a configuration allows a script-like file to be created entirely via keyboard interactions or by drag-and-drop operations whichever is more efficient for the user, while permitting the user to produce the correct syntax and value parameters, which would otherwise be very cumbersome for the user if the editor were a simple text-based editor.

According to another example, a multi-document interface allows for multiple procedures to be edited at the same time. New/Open/Save features are made available to allow the user to modify or edit an existing procedure or start a new one. When opening or saving procedures, the user is able to select the location and procedure name on the server to store or retrieve the procedure.

The available statements that can be used to create procedures are retrieved from the server and displayed in the statements panel. Statements can be added to the current procedure by drag-dropping them from the statements panel onto the procedure canvas, by double-clicking the statement in the statements panel, or by typing all or part of the statement name into the procedure canvas's text prompt. As each character is added/removed from the procedure canvas's text prompt, the list of available statements is evaluated to see if the text entered is contained within any of the statement names. The matching statements are displayed in a list beneath the text prompt, allowing the user to select a statement, via mouse or keyboard interaction, to be added to the procedure.

The text prompt does not allow arbitrary text to be entered. Any text that is entered is evaluated for statement matches only. If a value is entered into the text prompt that does not match or partially matches a statement, a statement will not be added to the procedure upon value commit, and the text prompt will be cleared.

In FIG. 6, the user is able to use the word "file" to find any statements that have the word file anywhere in their name. The possible matches in dropdown menu 140 are displayed in the list, and this can help the user locate the desired statement by only recalling a portion of the statement name.

Figure 7:
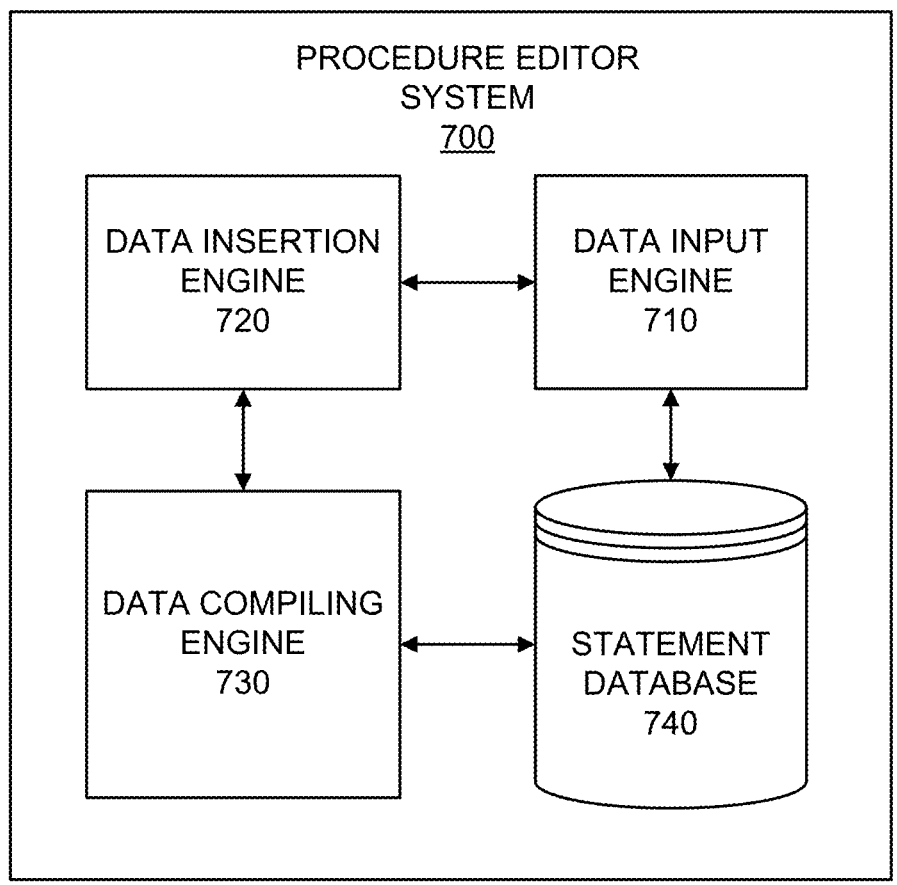
FIG. 7 illustrates an example system diagram of a procedure creation system that allows the existing parameter values to be edited directly on the virtual canvas, according to example embodiments of the present invention.

FIG. 7 illustrates a procedure editor system 700 according to example embodiments. Referring to FIG. 7, a script may be created based on the configuration of the procedure editor system 700. Referring to FIG. 7, creating a script may include receiving a request to load a procedure in a procedure editor application by the data input engine 710. The statement database 740 may then provide a list of predetermined statements based on the loaded procedure. A user or an automated selection tool may select a statement, and the statement selection may be received based on one or more of the list of predetermined statements and at least one specified location in the procedure. As a result, the statement may be inserted by the data insertion engine 720 into the loaded procedure at the specified location.

Generating a list of predetermined statements may include populating the list with more popular predetermined statements more frequently used during previous script creation procedures, the data compiling engine 730 may determine which statements are more popular based on more recently created scripts. The predetermined statements may be dynamically updated in the list during the script creation and may be based on step statements and/or condition statements. During the script creation procedure, a uniform resource locator (URL) may be accessed and invoked. The URL may correspond to a remote server's web service. Other attributes that may be invoked may include authentication tokens, user language preferences and/or a visual appearance preference when the procedure editor is launched. Other operations performed during script creation may include retrieving an initialization procedure on the remote server via the procedure editor by using the URL corresponding to the remote server and/or the authentication tokens to access the remote server. As a result, the remote server will provide the list of predetermined statements and the translated text based on the initialization procedure retrieved from the remote server. The list of predetermined statements and the translated text are based on predefined user preferences.

Example embodiments are preferably realized in a hardware device, such as, a server, computer, cellular phone, or other mobile terminal device etc. In other embodiments, the present invention may be realized in hardware, software, firmware or a combination of hardware, software and/or firmware. The above example embodiments may also be implemented in software code and may be stored on a computer readable medium, such as, for example, non-volatile memory devices (e.g., RAM, ROM, hard disk etc.). The software code may be accessed from the computer readable medium and may be executed by a processor. The executed program may provide one or more of the features of the example embodiments.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 8 illustrates an example network element 800, which may represent any of the above-described network components of the other figures.

Figure 8:
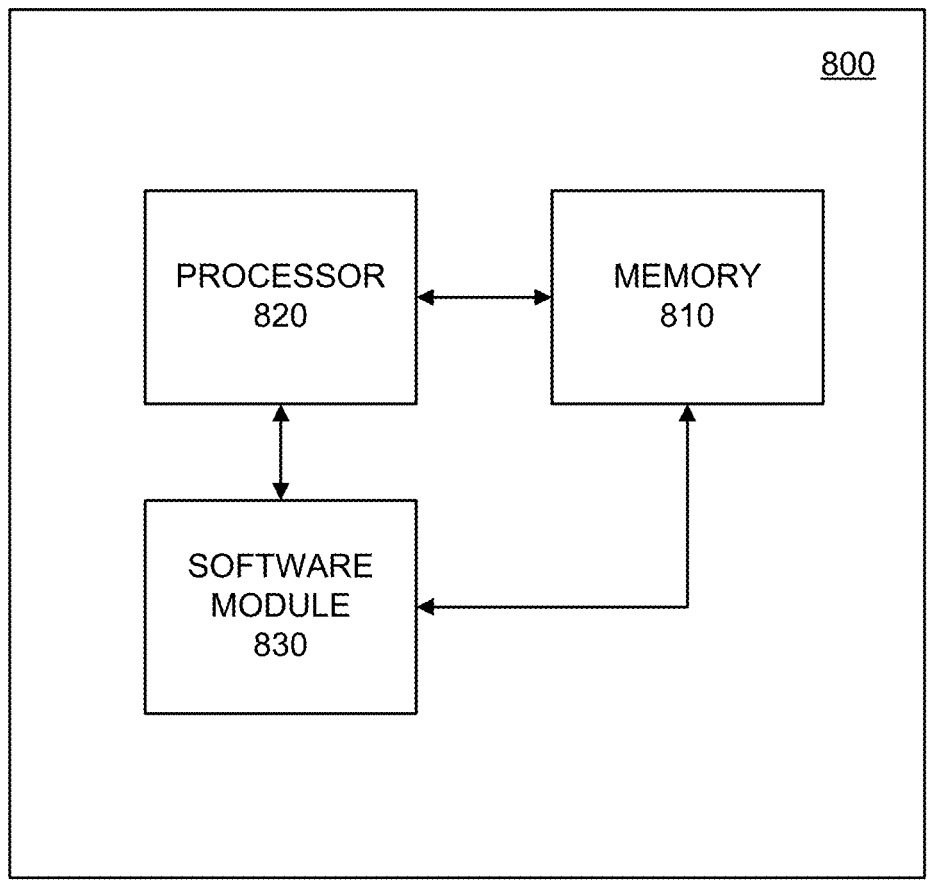
FIG. 8 illustrates an example network entity configured to store instructions and processing hardware for performing operations according to example embodiments of the present invention.

As illustrated in FIG. 8, a memory 810 and a processor 820 may be discrete components of the network entity 800 that are used to execute an application or set of operations. The application may be coded in software in a computer language understood by the processor 820, and stored in a computer readable medium, such as, the memory 810. The computer readable medium may be a non-transitory computer readable medium that includes tangible hardware components in addition to software stored in memory. Furthermore, a software module 830 may be another discrete entity that is part of the network entity 800, and which contains software instructions that may be executed by the processor 820. In addition to the above noted components of the network entity 800, the network entity 800 may also have a transmitter and receiver pair configured to receive and transmit communication signals (not shown).

Figure 9:
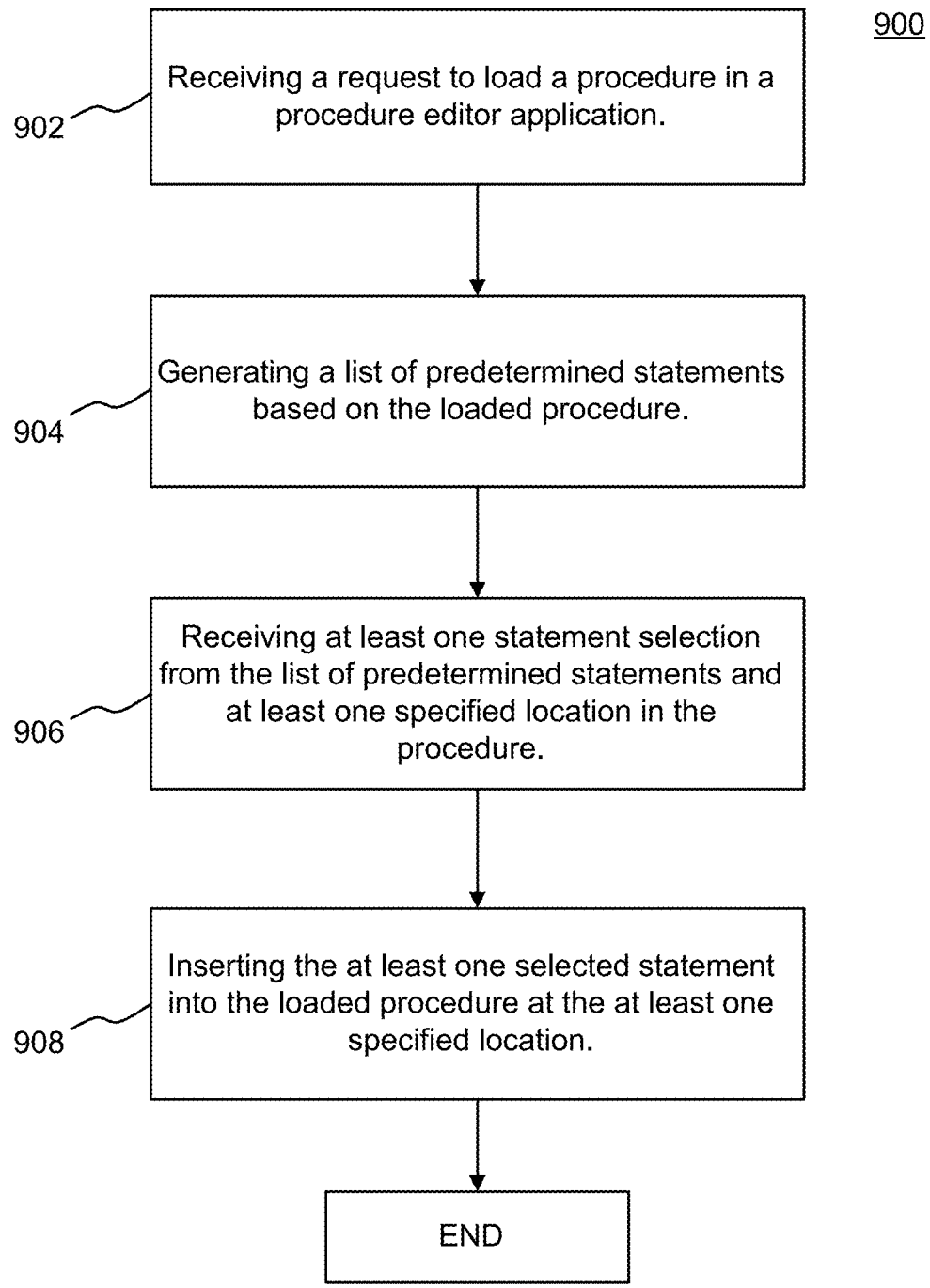
FIG. 9 illustrates an example flow diagram method of operation according to example embodiments of the present invention.

FIG. 9 illustrates an example method of creating a script 900. The method may include receiving a request to load a procedure in a procedure editor application, at operation 902 and generating a list of predetermined statements based on the loaded procedure at operation 904. The method may also include receiving at least one statement selection from the list of predetermined statements and at least one specified location in the procedure, at operation 906 and inserting the at least one selected statement into the loaded procedure at the at least one specified location, at operation 908.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method of creating a script, the method comprising:
receiving, via a receiver, a request to load a procedure in a procedure editor application;
generating, via a processor, a list of predetermined statements based on the loaded procedure;
invoking the list of predetermined statements to be paired with statements in the loaded procedure, wherein the list of predetermined statements are based on a context type of the loaded procedure being utilized and predefined user preferences;
receiving, via the receiver, at least one statement selection from the list of predetermined statements and at least one specified location in the procedure;
inserting, via the processor, the at least one selected statement into the loaded procedure at the at least one specified location; and
populating the procedure editor with the list of predetermined statements and translated text retrieved from a remote server;
wherein generating the list of predetermined statements comprises populating the list of predetermined statements with more frequently used predetermined statements used during previous script creation procedures.

2. The method of claim 1, wherein the predetermined statements are dynamically updated in the list of predetermined statements during the script creation.

3. The method of claim 1, wherein the predetermined statements comprise at least one of step statements and condition statements.

4. The method of claim 1, further comprising:
invoking at least one of a uniform resource locator (URL) corresponding to the remote server's web service, authentication tokens, user language preferences and a visual appearance preference when the procedure editor is launched.

5. The method of claim 4, further comprising: retrieving an initialization procedure on the remote server via the procedure editor by utilizing the URL corresponding to the remote server and the authentication tokens to access the remote server.

6. An apparatus configured to create a script, the apparatus comprising:
a receiver configured to receive a request to load a procedure in a procedure editor application;
a processor configured to generate a list of predetermined statements based on the loaded procedure,
invoke the list of predetermined statements to be paired with statements in the loaded procedure, wherein the list of predetermined statements are based on a context type of the loaded procedure being utilized and predefined user preferences;
receive at least one statement selection from the list of predetermined statements and at least one specified location in the procedure
insert the at least one selected statement into the loaded procedure at the at least one specified location, and
populating the procedure editor with the list of predetermined statements and translated text retrieved from a remote server;
wherein to generate the list of predetermined statements comprises the list of predetermined statements being populated with more frequently used predetermined statements used during previous script creation procedures.

7. The apparatus of claim 6, wherein the predetermined statements are dynamically updated in the list of predetermined statements during the script creation.

8. The apparatus of claim 6, wherein the predetermined statements comprise at least one of step statements and condition statements.

9. The apparatus of claim 6, wherein the processor is further configured to invoke at least one of a uniform resource locator (URL) corresponding to the remote server's web service, authentication tokens, user language preferences and a visual appearance preference when the procedure editor is launched.

10. The apparatus of claim 9, wherein the processor is further configured to retrieve an initialization procedure on the remote server via the procedure editor by utilizing the URL corresponding to the remote server and the authentication tokens to access the remote server.

11. A non-transitory computer readable storage medium configured to store instructions that when executed cause a processor to create a script, the processor being configured to perform:
receiving a request to load a procedure in a procedure editor application;
generating a list of predetermined statements based on the loaded procedure;
invoking the list of predetermined statements to be paired with statements in the loaded procedure, wherein the list of predetermined statements are based on a context type of the loaded procedure being utilized and predefined user preferences;
receiving at least one statement selection from the list of predetermined statements and at least one specified location in the procedure;
inserting the at least one selected statement into the loaded procedure at the at least one specified location; and
populating the procedure editor with the list of predetermined statements and translated text retrieved from a remote server;
generating the list of predetermined statements comprises populating the list with more frequently used predetermined statements used during previous script creation procedures.

12. The non-transitory computer readable storage medium of claim 11, wherein the predetermined statements are dynamically updated in the list of predetermined statements during the script creation.

13. The non-transitory computer readable storage medium of claim 11, wherein the predetermined statements comprise at least one of step statements and condition statements.

14. The non-transitory computer readable storage medium of claim 11, wherein the processor is further configured to perform:
    invoking at least one of a uniform resource locator (URL) corresponding to the remote server's web service, authentication tokens, user language preferences and a visual appearance preference when the procedure editor is launched.

15. The non-transitory computer readable storage medium of claim 11, wherein the processor is further configured to perform: retrieving an initialization procedure on the remote server via the procedure editor by utilizing the URL corresponding to the remote server and the authentication tokens to access the remote server.

* * * * *